United States Patent [19]

Cipri

[11] Patent Number: 4,479,110
[45] Date of Patent: Oct. 23, 1984

[54] AUTOMOBILE BURGLAR ALARM AND ARMING CIRCUIT FOR SAME

[76] Inventor: Teno P. Cipri, 658 Borregas Ave., Sunnyvale, Calif. 94086

[21] Appl. No.: 340,263

[22] Filed: Jan. 18, 1982

[51] Int. Cl.³ ............................................. B60R 25/00
[52] U.S. Cl. ....................................... 340/63; 340/64; 340/52 R; 307/10 AT
[58] Field of Search ..................... 340/63–65, 340/52 R, 506, 516, 523, 526, 527, 528, 529, 530; 307/10 AT, 116, 141

[56] References Cited
U.S. PATENT DOCUMENTS

| | | | |
|---|---|---|---|
| 4,123,745 | 10/1978 | Gurgone | 340/63 |
| 4,136,334 | 1/1979 | Seifers | 340/63 |
| 4,159,466 | 6/1979 | Mensel | 340/63 |
| 4,188,621 | 2/1980 | Heckelman et al. | 340/63 |

Primary Examiner—Donnie L. Crosland
Attorney, Agent, or Firm—Paul L. Hickman

[57] ABSTRACT

A vehicle burglar alarm characterized by an arming circuit including a transition detector coupled to a door switch, and a divide-by-two and latching coupled to the transition detector; and a timing circuit responsive to the output of the arming circuit. The transition detector is polarity independent and develops a positive pulse for either a negative going or positive going transition at its input. The divide-by-two and latching preferably includes a first astable multivibrator which develops a negative going output signal after two transition signal pulses are received from the transition detector, and a second astable multivibrator responsive to the negative going output signal of the first multivibrator and operative to enable the timing circuit and simultaneously latch the first multivibrator. Thus, the timing circuit is enabled only after the vehicle's door is opened and then subsequently closed.

9 Claims, 6 Drawing Figures

AUTOMOBILE BURGLAR ALARM AND ARMING CIRCUIT FOR SAME

BACKGROUND OF THE INVENTION

1. Field of the Invention

This invention relates generally to burglar alarms and more particularly to electronic burglar alarms for automobiles and other vehicles.

2. Description of the Prior Art

The prior art teaches many types of vehicle burglar alarms. Typically these alarms are manually armed by a hidden or locking switch, and are disarmed before or shortly after re-entry into the vehicle.

A problem with many of these prior art vehicle burglar alarms is that they must be manually armed and disarmed. If, for example, a driver were to forget to arm the burglar alarm his or her vehicle would be left unprotected. If the driver remembered to arm the alarm but forgot to disarm it, he or she would be caught in the embarrassing position of setting off their own vehicle's alarm system.

A number of prior art patents have addressed this problem by automating the arming of a burglar alarm. For example, in U.S. Pat. No. 4,159,466 of Mengel a burglar alarm system is described which utilizes a flip flop (IC5) to start or stop a clock (IC1). As noted in column two of the description, a voltage developed by the opening of a vehicle's door on pin 6 of IC5 causes the flip flop to change state and start the clock timer. Thus, Mengel's alarm is armed in response to the opening of a vehicle's door. A problem with Mengel's device is that the burglar alarm is armed and will go off after a period of time even if the door is left deliberately open, such as for the unloading of cargo from the vehicle.

In U.S. Pat. No. 4,262,279 Dublirer teaches an alarm which "automatically provides . . . protection without requiring the owner to perform any [special] acts . . . ". The invention of Dublirer has the same disadvantage pointed out with Mengel, i.e. the alarm is armed with the opening of the vehicle's door and not with its subsequent closure.

Gurgone in U.S. Pat. No. 4,123,745 describes two embodiments of an auto alarm which disables the ignition after a door is opened. He thereby circumvents the problem of Mengel's and Dublirer's inventions because no alarm will sound if the vehicle's door is left open for extended periods of time. Unfortunately, this circumvention precludes the use of an audible alarm to broadcast the fact of an illegal entry into the vehicle.

A number of other patents teach the use of delay circuits to allow a vehicle's operator to enter or exit the vehicle without setting off the alarm. Typical examples of such are U.S. Pat. Nos. 4,188,621 and 4,136,334. The prior art burglar alarms with delay circuits are often complex and expensive, and are not always capable of complex functions.

SUMMARY OF THE INVENTION

An object of this invention is to provide a vehicle burglar alarm which is automatically armed and disarmed by the normal actions of an authorized driver.

Another object of this invention is to provide an arming circuit which will not actuate a vehicle's burglar alarm until after the driver's door is opened and then subsequently closed.

A further, related object of this invention is to provide a simple, economical transition detector that is polarity independent.

Yet another object of this invention is to provide a timing circuit for a vehicle burglar alarm which allows time for the authorized user of the vehicle to exit and re-enter the vehicle, and which prevents the alarm from sounding indefinitely.

Briefly, the invention comprises an arming circuit including a transition detector coupled to the door switch of the vehicle, and a divide-by-two and latching circuit coupled to the transition detector; and a timing circuit responsive to the output of the arming circuit. The arming circuit arms the timing circuit only after the opening and subsequent closing of the vehicle's door.

The transition detector has a single P.N.P. transistor with its emitter coupled to the vehicle's power source, its base coupled to ground by an RC network, and its collector coupled back to the base by a diode. A single, positive pulse is developed at the collector whenever an input signal (applied to the RC network) makes either a negative going or positive going transition.

The arming circuit includes a first astable multivibrator which develops a positive going output signal after two transition signals or pulses are received from the transition detector. A second multivibrator responsive to the positive going signal of the multivibrator develops the arming signal and latches the first multivibrator.

The timing circuit includes an arming delay, a re-entry delay, and an alarm timer. The arming delay is coupled to the arming circuit, and the re-entry delay is coupled to the driver's door switch. The alarm timer is coupled both to the output of the re-entry delay and to undelayed signals developed by switches at the hood and trunk of the vehicle. The arming delay develops a signal which enables and disables the re-entry delay and the alarm timer.

An advantage of this invention is that the burglar alarm is automatically armed when the driver turns off the ignition, opens the vehicle's door, gets out, and closes the door again. The alarm is automatically disarmed when the driver opens the door and turns on the ignition. Thus the alarm is armed and disarmed by the normal actions of an authorized driver.

Another advantage of this invention is that the arming circuit will not arm the alarm until after the driver's door is opened and then subsequently closed. This solves the prior art problem of false alarms caused by leaving the vehicle's door open too long.

Yet another advantage of this invention is that the transition detector operates with a minimum of component parts and has an input that is polarity independent. This means that the input to the transition detector need never be inverted, as is true with other designs.

These and other objects and advantages of the present invention will no doubt become apparent upon a reading of the following descriptions and a study of the several figures of the drawing.

DETAILED DESCRIPTION OF THE PREFERRED EMBODIMENT(S)

Figure 1:
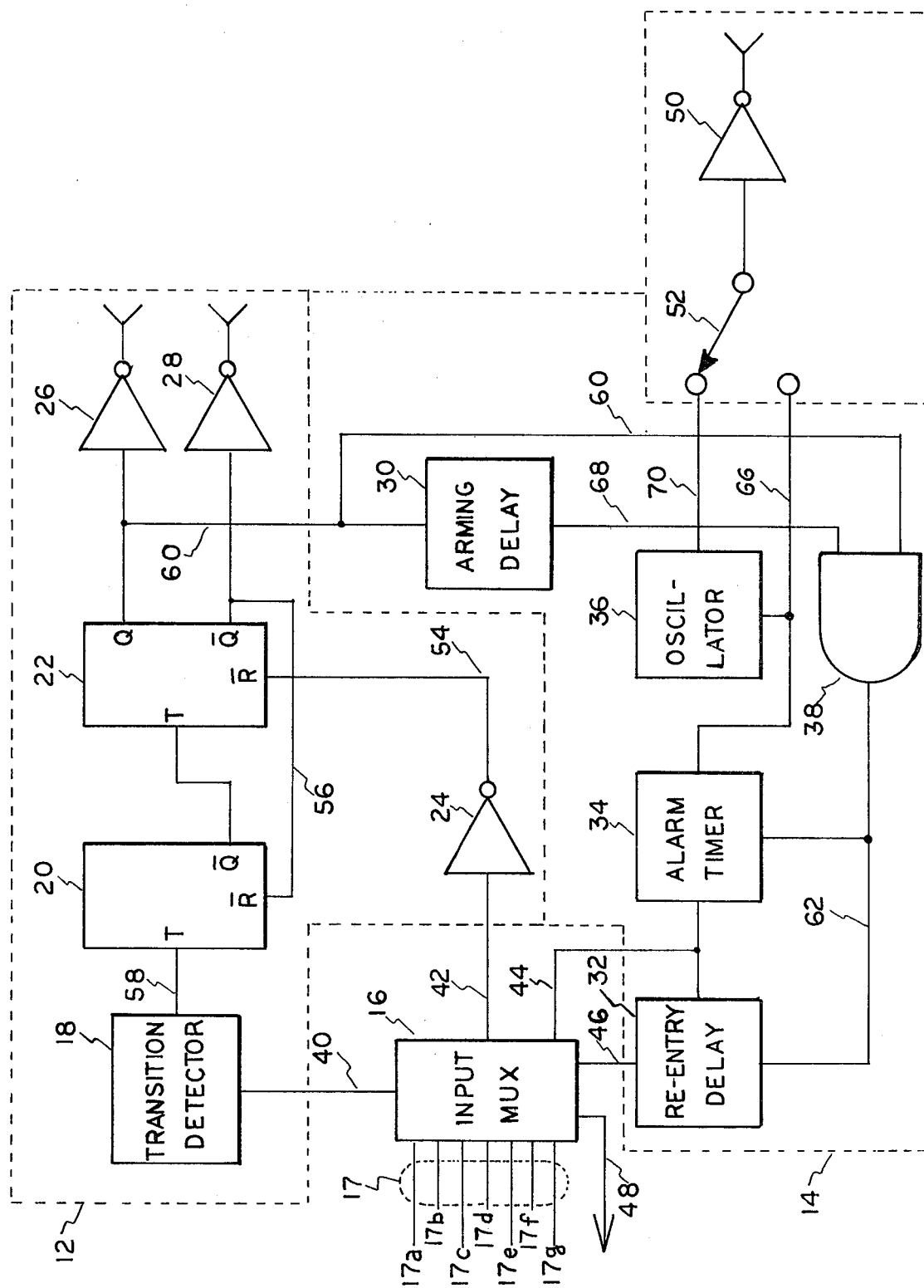
FIG. 1 is a block diagram of a preferred embodiment of the present invention.

Referring to FIG. 1, a vehicle burglar alarm in accordance with the present invention includes an arming circuit 12, and a timing circuit 14. An input multiplexer 16 steers incoming signals on lines 17 to appropriate devices within the arming circuit and the timing circuit.

Arming circuit 12 includes a transition detector 18, a first astable multivibrator 20, a second astable multivibrator 22, an inverter 24, and inverting drivers 26 and 28. The two astable multivibrators are coupled together as a divide-by-two and latching, i.e. the Q output of multivibrator 22 will go HI and stay HI after two pulses are detected at input T of multivibrator 20.

Timing circuit 14 includes an arming delay 30, a re-entry delay 32, an alarm timer 34, an oscillator 36, and a dual input AND gate 38. The timing circuit has inputs from both the arming circuit 12 and the input multiplexer 16.

Figures 1A, 3:
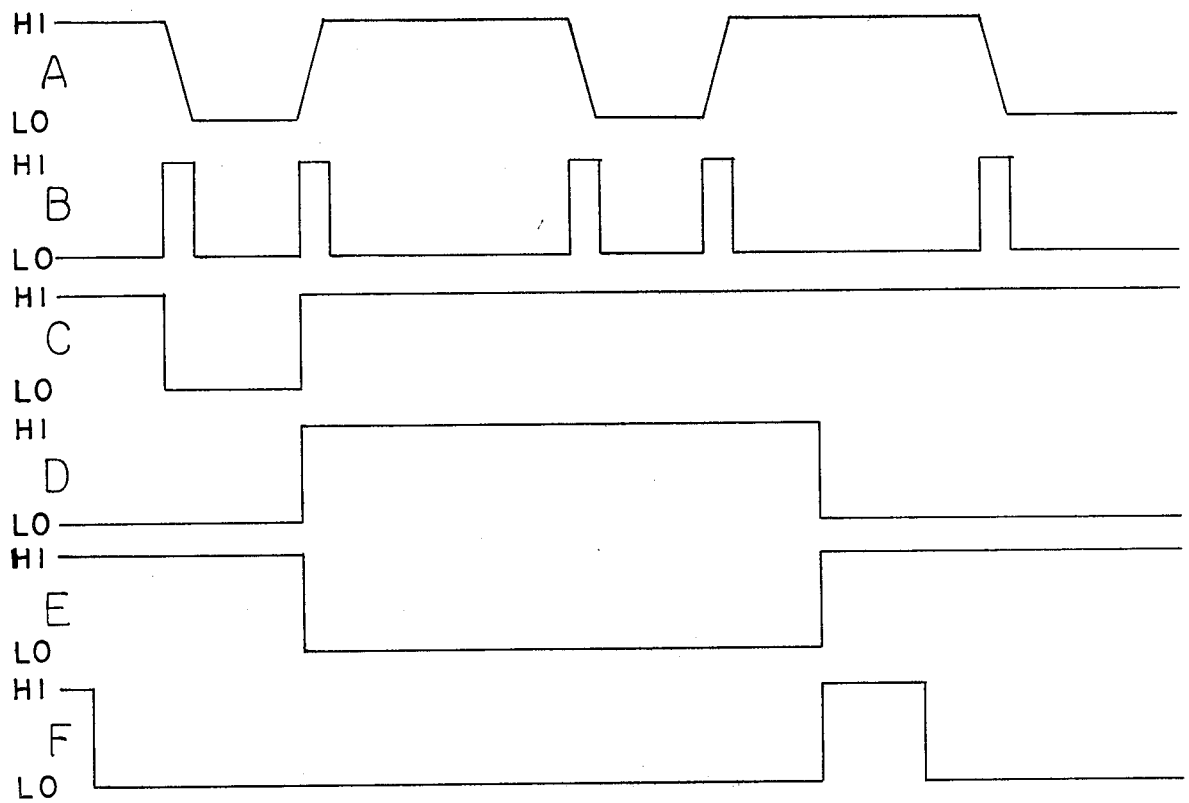
FIG. 1a is a table relating the inputs and outputs of the multiplexer shown in FIG. 1.
FIG. 3 is a timing diagram illustrating the operation of the circuit of FIG. 1.

Input multiplexer 16 has inputs of lines 17a–17g and output of lines 42, 44, 46, and 48. Line 48 is coupled to the vehicle's interior light. In the present embodiment 17a is a reserved input, 17b is connected to a switch actuated by the driver's door, 17c is connected to a switch actuated by the passenger's door, 17d is coupled to the output of a motion detector, 17e is connected to the vehicle's ignition switch, 17f in a first non-delayed input, and 17g is a second non-delayed input. In FIG. 1a a table is shown for the multiplexer relating input and output logic levels. As an example, when an input signal is applied to line 17b, a signal is developed on output lines 46 and 48.

While there are many types of circuits which could perform the functions of multiplexer 16, a preferred circuit would simply use steering diodes to couple the inputs to the appropriate outputs.

The burglar alarm also includes an alarm driver 50. As will be discussed more fully later, the alarm driver is selectively coupled to either a continuous alarm signal or an oscillating alarm signal by a switch 52.

When installed in the vehicle, lines 17a–17g are connected to their appropriate external connection points, line 48 is coupled to the vehicle's interior light, and the output of driver 50 is either coupled to the vehicle's horn or to an auxiliary alarm. The outputs of drivers 26 and 28 allow the optional connection of the arming circuit of the present device to an external alarm system.

In use, the driver of a vehicle equipped with the present device first stops the vehicle and then turns off the ignition. This action cuts off the signal on line 17e of the multiplexer and thus removes the signal on line 42. Inverter 24 inverts the signal on line 42 to develop a LO signal on a line 54 which is coupled to the $\overline{R}$(inverse reset) input of multivibrator 22. Assuming the $\overline{Q}$ output of the astable multivibrator is low, this causes the Q output of multivibrator 22 to go LO and the $\overline{Q}$ output to go HI. Since the $\overline{Q}$ output of multivibrator 22 is coupled to the $\overline{R}$(inverse reset) input of multivibrator 20 by a line 56 the Q output of multivibrator 20 is already LO and the $\overline{Q}$ output is HI. Thus, shutting off the vehicle's ignition switch resets both of the multivibrators of the arming circuit.

As the driver's door is opened a signal is developed on line 17b. Depending upon the vehicle, the signal can be either positive going or negative going, but for the present discussion we will assume that it is positive going. As noted on the multiplexer table, a signal on line 17b will produce a change in the signal on line 40. Transition detector 18 will produce a pulse on line 58 in response to any transition detected in the signal on line 40. Thus, each time the driver's door is opened or closed, a positive going transition signal pulse is developed on line 58.

Line 58 is coupled to the T (trigger) input of multivibrator 20. As the driver opens the driver's door multivibrator 20 is triggered and the Q output goes HI and the $\overline{Q}$ output goes LO. The negative transition of the $\overline{Q}$ output, which is connected to the T (trigger) input of multivibrator 22, does not effect the state of multivibrator 22 because it is only triggered on positive going transitions. Thus the act of opening the vehicle's door does not cause the arming circuit to produce an arming signal.

As the driver leaves the vehicle and closes the driver's door the signal on 17b will again change, causing a transition on line 40. This develops a second transition signal pulse on line 58 which causes $\overline{Q}$ of multiplexer 20 to go HI. This positive transition triggers multiplexer 22 so that its Q output goes HI and its $\overline{Q}$ output goes LO. The $\overline{Q}$ output of multiplexer 22 develops a LO signal at the $\overline{R}$ (inverted reset) input of multiplexer 20, disabling the T (trigger) input. $\overline{Q}$ of the astable multivibrator 22 remains HI. In other words, after the driver's door is both opened and closed an arming signal is developed on a line 60 by the Q output of multiplexer 22 and further opening and closings of the driver's door will not effect the arming signal. Thus, the two multivibrators are effectively connected as a divide-by-two and latching circuit.

Thus far the driver has shut off the vehicle's ignition, exited the car, and closed the driver's door. It will be noted that these are the very same acts that are performed by a vehicle's operator in almost all circumstances in any case. The arming of the burglar alarm is thus completely automatic and need not be a concern to the driver.

Prior to the development of the arming signal on line 60 the timing circuit of the alarm was disabled by the output of AND gate 38. More specifically, when the signal on line 60 is LO the output signal on line 62 of the AND gate is also LO. Line 62 is coupled to the $\overline{R}$ (inverse reset) inputs of re-entry delay 32 and alarm timer 34 insuring that their outputs on lines 64 and 66, respectively, are LO.

Arming delay 30 is activated by a HI arming signal on line 60. After a predetermined period of time (usually about 30 seconds) arming delay will develop a delayed arming signal on a line 68. If the arming signal on line 60 is still HI, i.e. the ignition switch has not been turned back on, the AND gate 38 will develop a HI signal on line 62, enabling re-entry delay 32 and alarm timer 34. To summarize, about 30 seconds after the driver turns off the ignition, opens the driver's door, and then closes the driver's door the timing circuit is fully armed.

At this point several different scenarios are possible. For example, a signal might be developed on one of lines 17f or 17g to produce an alarm timer actuating signal on line 44. Lines 17f and 17g are known as undelayed entry signals and are typically coupled to hidden switches on the hood, trunk, windows, etc. If a signal is received on one of these lines, and if the timing circuit is armed by the arming circuit, the alarm timer will immediately develop an alarm signal on line 66 for a predetermined period of time (usually about 45 seconds). The alarm signal enables the $\overline{R}$(inverse reset) input of oscillator 36 to produce an oscillating alarm signal on a line 70. The alarm driver 50 is selectively coupled to either line 66 or 70 by switch 52. When the alarm driver is coupled to line 66 a steady output is produced to drive, for example, an alarm bell or siren. When the alarm driver is coupled to line 70 an oscillating output is produced, preferably to actuate the vehicle's horn.

To summarize, after the timing circuit is fully armed, an unauthorized entry into a portion of the vehicle protected by an undelayed entry switch will cause the alarm to actuate immediately and to sound for approximately 45 seconds. After that time the alarm will not sound again until there is another signal on line 44.

A second scenario occurs when a signal is developed on line 17c when the passenger's door is opened. A re-entry signal is developed on line 46 which actuates re-entry delay 32. After a predetermined period of time (usually about 15 seconds) re-entry delay 32 develops a delayed re-entry signal on line 64 to actuate the alarm timer, as discussed above. The six second delay allows an authorized person to turn on the ignition switch and thus reset the arming and timing circuits.

A third possibility is that a signal will be developed on line 17b by the re-opening of the driver's door. With reference to FIG. 1a, this will cause signals to be developed on lines 40, and 46, and the interior light will be turned on via line 48. The signal on line 40 will have no effect, as multivibrator 20 is latched by the signal on line 56. The signal on line 46 will actuate the re-entry delay and the alarm timer as described above. Again, if the ignition is turned on within the time required by the re-entry delay the entire alarm system will be reset.

Figure 2:
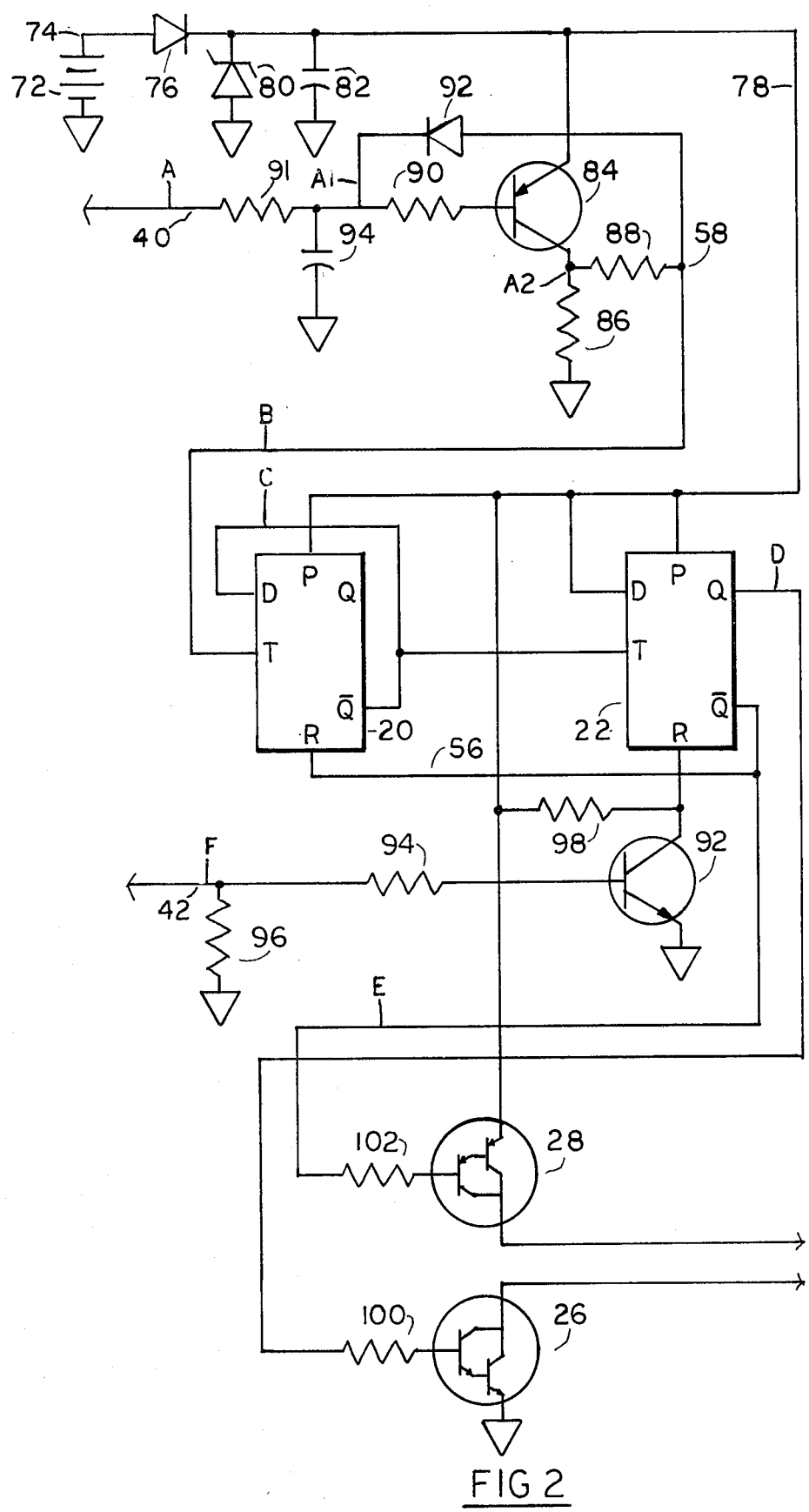
FIG. 2 is a schematic of the arming circuit shown in FIG. 1.

Referring now to FIG. 2, a schematic of a preferred embodiment of the arming circuit is shown. The vehicle's battery 72 is negative grounded and typically develops about 12 volts on a line 74. A forward biased diode 76 couples line 74 to a power line 78 to prevent possible damage caused by an accidentally reversed connection, and a zener 80 and capacitor 82 couple the power line to ground. Diode 76, zener 80, and capacitor 82 provide power regulation for the circuit and inhibit the development of transients on the power line 78.

The transition detector includes a PNP transistor 84, a pair of current dividing resistors 86 and 88, a base bias resistor 90, a diode 92, and a timing capacitor 94. The emitter of the transistor is coupled to the power line, its base is coupled to line 40 by the series connection of current limiting resistor 90 and a resistor 91, and its collector is coupled to ground by resistor 86. The collector is also coupled to line 40 by the series connection of resistor 88, diode 92, and resistor 91. Timing capacitor 94 is coupled between resistor 91 and ground.

Line 40 is coupled between the door switch and the interior light of the vehicle. As will be explained more fully below, it does not matter whether the door switch grounds resistor 91 or provides a connection to battery 72, as either occurrence will cause the transition detector to produce a signal on line 58.

Figure 4A:
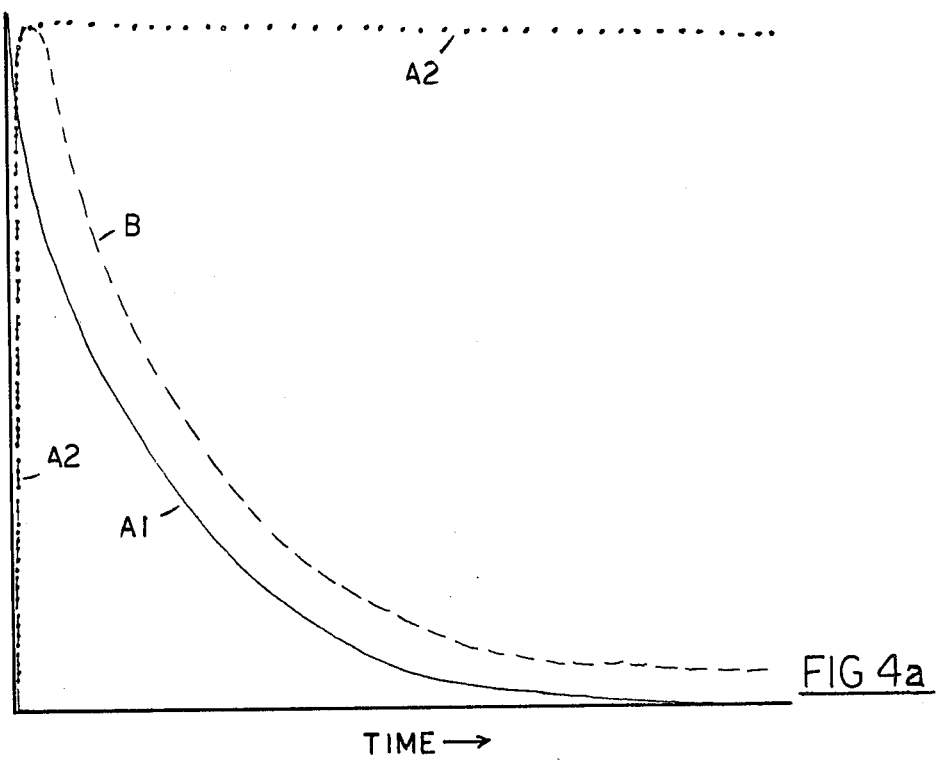
FIG. 4a is a first graph for illustrating the operation of the transition detector subcircuit of the arming circuit.

Closing the door switch discharges capacitor 94 through resistor 91 at a rate R governed by the following equation:

$$R = (0.63 \times V_i) \times (R_{91} \times C_{94})$$

where $V_i$ is the instantaneous voltage (initially 12 volts), $R_{91}$ is the resistance of resistor 91, and $C_{94}$ is the capacitance of capacitor 94. The value $(0.63 \times V_i)$ is the change in voltage over a period of time $t = R_{91} \times C_{94}$. After about 0.2 milliseconds the base voltage $V_{BE}$ at transistor 84 is about 11.3 volts. As the transistor begins to saturate its collector is pulled up to about 11.7 volts, assuming a $V_{CE}$ of about 0.3 volts for the transistor. With additional reference to FIG. 4a, diode 92 is reverse biased for about 1 millisecond and the transition detector's output B on line 58 follows the transistor 84 collector's signal A2, since the impedance of the circuit at B is high. After about 0.7 milliseconds capacitor 94 is discharged to approximately 11 volts, while the voltage level at B is about 11.7 volts and diode 92 is forward biased. The voltage at B is pulled towards the voltage level at A2 to about 1.5 volts and remains at that level until a new transition signal occurs on line 40.

Figure 4B:
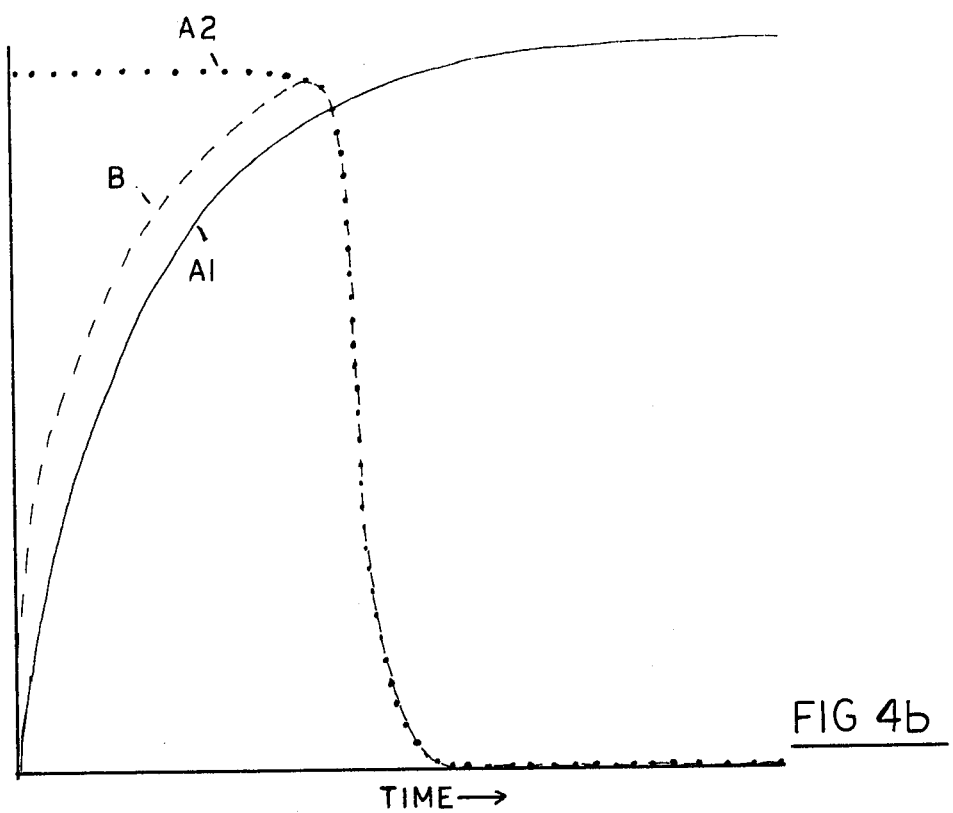
FIG. 4b is a second graph for illustrating the operation of the transition detector subcircuit.

When the door switch is opened a new transition signal is developed on line 40. With addition reference to FIG. 4b, the capacitor 94 is charged through the series connection of the interior light and resistor 91. After capacitor 94 is sufficiently charged to bias transistor 84 off, the collector of transistor 84 is pulled to ground by resistor 86. Diode 92 becomes reverse biased and the output signal B is pulled to ground through resistors 86 and 88. As noted in FIGS. 4a and 4b, either a positive going or a negative going transition signal A on line 40 will produce a positive going signal pulse B on the transition detector's output line 58.

The astable multivibrators 20 and 22 are, in this embodiment, D type flip flops having a D input and a $\overline{P}$ (inverse preset) input in addition to the T, Q, $\overline{Q}$, and $\overline{R}$ inputs mentioned previously. As seen in the figure, the $\overline{Q}$ output of multivibrator 20 is coupled to the D input by a line 90 and the D input of multivibrator 22 is coupled to power line 78. The $\overline{P}$ inputs of both the multivibrators are coupled to the power line to insure that the multivibrators are never preset. The dual D flip flops are coupled together as a divide-by-two and latching, as described previously.

In this figure the inverter 24 is shown to include an NPN transistor 92, a pair of base biasing resistors 94 and 96, and a pull up resistor 98. The collector of the transistor is coupled to the $\overline{R}$ input of multivibrator 22, and the emitter is grounded. The transistor inverts the signal on line 42.

Inverting drivers 26 and 28 are shown here as being Darlington devices coupled to the Q and $\overline{Q}$ outputs, respectively, of multivibrator 22 by resistors 100 and 102, respectively.

The operation of the arming circuit will be discussed with reference to FIG. 3, where the capitalized letters 'A'–'F' preceding each waveform refer to the circuit labels 'A'–'F' of FIG. 2. Waveform A illustrates the signal on line 40 caused by the opening and closing of the driver's door. Waveform B is the signal produced by the transition detector on line 58; waveform C is the Q output of multivibrator 20; waveform D is the Q output of multivibrator 22; waveform E is the $\overline{Q}$ output of multivibrator 22; and waveform F is the signal on line 42 developed by the ignition switch At time T0 the ignition signal (waveform F) goes from HI to LO as the driver shuts off the ignition. At T1 the driver's door is opened causing a HI to LO transition (waveform A) at the input of the transition detector, which produces a positive pulse (waveform B). This triggers multivibrator 20 to cause a negative transition (waveform C).

At time T2 the closure of the driver's door (waveform A) causes the transition detector to develop a second pulse (waveform B) which again triggers multivibrator 20 (waveform C). The $\overline{Q}$ output of the multivibrator 20 triggers multivibrator 22 (waveforms D and E) producing an arming signal at either or both outputs Q and $\overline{Q}$.

Subsequent opening and closing of the driver's door at T3 and T4 (waveform A) produce transition detection pulses (waveform B) but does not effect the states of the multivibrators (waveforms C-E). At a time T5 the ignition is turned back on (waveform F) and the multivibrators are reset. As long as the ignition switch is ON the transition pulses, such as the one at T6, will not effect the state of the latched multivibrators. At a time T7 the ignition switch is turned off (waveform F) and the arming cycle can begin again as at T0.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A vehicle burglar alarm arming circuit for a burglar alarm installed within a vehicle having a negative ground D.C. power source, a door switch coupled to said power source and actuated by the opening and closing of a door of the vehicle, and an ignition switch coupled to said power source, said arming circuit comprising:
   (a) a transition detector coupled to said door switch and operative to develop a transition signal pulse when said door switch opens or closes; and
   (b) divide-by-two and latching means coupled to said transition detector and operative to produce an arming signal after counting two consecutive transition signal pulses.

2. A vehicle burglar alarm arming circuit as recited in claim 1 wherein said transition detector includes a P.N.P. transistor, a capacitor coupling the base of said transistor to ground, a first current divider resistor coupling the collector of said transistor to ground, a diode having its cathode coupled to said base, and a second current divider resistor coupling said collector to the anode of said transistor.

3. A vehicle burglar alarm arming circuit as recited in claim 1 wherein said divide-by-two and latching means includes a first bistable multivibrator having a first trigger input, a first inverted reset input, and a first inverted output; and a second bistable multivibrator having a second trigger input, a second output, and a second inverted output; where said first inverted output is coupled to said second trigger input, and said second inverted output is coupled to said first inverted reset input.

4. A vehicle burglar alarm arming circuit as recited in claim 3 wherein said first bistable multivibrator further includes a clocked input coupled to said first inverted output.

5. A transition detector for a burglar alarm installed within a vehicle having a D.C. power source, the transition detector comprising a P.N.P. transistor, a base biasing resistor coupled at one end to the base of said transistor, a capacitor coupling the other end of said base biasing transistor to ground, a first current divider resistor coupling the collector of said transistor to ground, a diode having its cathode coupled to the juncture of said capacitor and said base biasing resistor, and a second current divider resistor coupling said collector to the anode of said diode.

6. A burglar alarm for a vehicle having a negative ground D.C. power source, a door switch coupled to said power source and actuated by the opening and closing of a door of the vehicle, and an ignition switch coupled to said power source, said burglar alarm comprising:
   (a) a transition detector coupled to said door switch and operative to develop a first transition signal pulse when said door is opened, and a second transition signal pulse when said door is subsequently closed;
   (b) divide-by-two and latching means coupled to said transition detector and operative to produce an arming signal after said second transition signal pulse has been developed; and
   (c) an alarm timer responsive to said arming signal and to a re-entry detection signal, and operative to produce an alarm signal for a first predetermined period of time.

7. A burglar alarm as recited in claim 6 further comprising an arming delay responsive to said arming signal and operative to develop a delayed arming signal after a second predetermined period of time; a re-entry delay coupled to said door switch and operative to develop a delayed re-entry signal after a third predetermined period of time; and an AND gate responsive to said arming signal and said delayed arming signal and operative to produce an enabling signal for said re-entry delay and said alarm timer.

8. A burglar alarm as recited in claim 7 further comprising an oscillator responsive to said alarm signal and operative to develop an oscillating alarm signal.

9. A burglar alarm as recited in claim 8 further comprising an alarm driver selectively responsive to one of said alarm signal and said oscillating alarm signal, and operative to develop an alarm driving signal.

* * * * *